United States Patent Office 2,974,054
Patented Mar. 7, 1961

2,974,054

TREATMENT OF CLAY

John W. Beamesderfer, Orono, Maine, and Horton H. Morris, Macon, Ga., assignors to Southern Clays, Inc., New York, N.Y., a corporation of Georgia No Drawing. Filed Aug. 7, 1957, Ser. No. 676,711

4 Claims. (Cl. 106—288)

This invention relates to improvements in the treatment of clay for the production of pigments and other products therefrom; and includes improved processes of treating clay and improved products produced by such treatment.

In the treatment of clay according to the present invention, the clay, such as Georgia kaolin clay, is first subjected to calcining within the temperature range of about 930° to 1650° F. (about 500° to 900° C.) and the calcined clay is then treated with dilute phosphoric acid, or with a mixture of dilute phosphoric and sulfuric acids, to extract the alumina as aluminum phosphate, or a mixture of aluminum phosphate and aluminum sulfate, leaving behind a silica residue in platelet form; and the resulting solution, after separation from the silica residue, is neutralized with an alkaline compound which will form an insoluble precipitate with the excess acid, and with the resulting production of a composite phosphate, or phosphate-sulfate pigment.

The clay, which is advantageously used in carrying out the present process, is a clay such as a kaolin clay or coating clay such as the kaolin or coating clays found in Georgia. These clays are essentially aluminum silicates, and usually contain small amounts of iron and titanium compounds.

We have found that clays which have been previously calcined, within the range above indicated, can readily be treated with dilute phosphoric acid, or a mixture of dilute phosphoric acid and dilute sulfuric acid, to extract the alumina therefrom; and that the use of such dilute acids has advantages over the use of concentrated acids for such extraction. The dilute acids can be used with less corrosion problems than when hot concentrated acids are used. An excess, but not a large excess, of the dilute acid is required to keep the dissolved aluminum salts in solution, and the excess acid is recovered directly as a part of the composite pigment product by the addition to the solution containing the extracted aluminum of alkaline compounds which form insoluble precipitates with the excess acid.

The extraction process, when dilute phosphoric acid alone is used for extracting the alumina from the calcined clay, differs in important respects from the process in which a mixture of dilute phosphoric and sulfuric acids is used; and the composite pigment products produced are different with these two different processes. When dilute phosphoric acid alone is used, the resulting solution of aluminum phosphate with excess phosphoric acid will, when neutralized with the alkaline compound, form a composite phosphate precipitate. When a mixture of dilute phosphoric and sulfuric acids is used, the resulting solution of alumina in the mixed acids will, when neutralized with the alkaline compound, form a composite pigment containing both insoluble phosphates and sulfates.

For example, in the first of the two methods, in which hot dilute phosphoric acid is used to extract the alumina from the calcined clay, the treatment of the resulting solution, after removal of undissolved material, with a lime slurry, will precipitate a composite white pigment which is essentially a phosphate pigment and is probably a mixture of aluminum phosphates, calcium aluminum phosphates, and calcium phosphates.

In the second of the two methods, in which a mixture of sulfuric acid and phosphoric acid is used in place of the phosphoric acid alone, the resulting solution, after separation from the undissolved material, may similarly be treated with a lime slurry to give a composite pigment which contains both phosphates and sulfates, and which probably is a mixture of aluminum phosphates, calcium phosphates, calcium sulfate, and calcium-aluminum phosphates.

The use of hot dilute phosphoric acid alone for extracting the alumina from the clay has the advantage that a composite pigment can be produced which is essentially a mixed phosphate pigment. The use of a mixture of dilute phosphoric acid and dilute sulfuric acid together has the advantage that less of the more expensive phosphoric acid is required and a different and distinctive composite pigment is produced containing both phosphates and sulfates.

One advantageous method of carrying out the process when a mixture of phosphoric and sulfuric acids is used is to use an amount of dilute phosphoric acid equal to or approximately equal to the amount theoretically required to produce $AlPO_4$ with the alumina content of the clay, and to use sulfuric acid as the excess amount of acid required for carrying out the process. When the solution resulting from the use of this mixture of acids is neutralized, e.g., with lime to form a composite pigment, the aluminum and phosphoric acid will be present in approximately the proportions of aluminum phosphate, and the proportions of calcium and sulfuric acid in approximately the proportions of gypsum, although more complex composite products may also be present.

The alkalis which are used for neutralizing the excess acid of the acid solution to precipitate the composite insoluble pigment are alkaline compounds which will form insoluble precipitates, such as calcium, barium, or magnesium oxides or hydroxides, etc.

The silica residue remaining after the extraction of the alumina from the calcined clay by the dilute acid treatment is itself a valuable product. It consists essentially of silica having a plate-like structure similar to that of the kaolin clay, with a high surface area, a particle size distribution similar to that of the clay starting material, and an acid nature. Small amounts of undissolved clay or partially dissolved clay, and of alumina contained therein, may be present in this silica product. The properties of this acid product make it a valuable material for use as a catalyst or catalyst carrier, and also for use as a bleaching earth. Because of the acid nature of this silica product, it can be used e.g. as an acid bleaching earth for bleaching oils and other materials, in place of bleaching clays or other bleaching earths. Its acid nature also makes it a valuable catalyst for use in catalytic cracking processes such as those where the catalyst is carried along in suspension in the oil undergoing cracking.

This acid silica product can also be used to advantage as a filler for addition to paper pulp, e.g., in the beater where its acid properties are taken advantage of in neutralizing the alkaline compounds present in the pulp and in furnishing a filling pigment to the resulting paper.

The acid silica product produced by the process is not, because of its acid nature, suitable for use as a coating pigment. But by treating this acid silica product with a base such as ammonium hydroxide or sodium hydroxide to neutralize the acid, and by removing the resulting salt by washing, a silica product of a somewhat different nature and having an alkaline surface, rather than an acid surface, is produced, which can advantageously be used as a paper coating pigment.

The acid silica product directly produced as a residue from the dilute acid extraction of the calcined clay still contains some unextracted alumina and some of the impurities of the original clay. Some of the titanium compounds present in small amount in the original clay resist extraction by dilute acid and remain in the silica residue. To the extent that titanium and other compounds such as iron compounds are soluble in the dilute acid used for extracting the alumina, they will also be removed. But titanium and other compounds which are not so extracted remain in the silica product and reduce its brightness as a pigment.

We have found that the byproduct silica product so produced can advantageously be further treated with hot sulfuric acid and converted into a purified silica product of high brightness. The treatment of this silica product with hot sulfuric acid results in removal from it of the small amounts of alumina it contains and impurities such as titanium compounds and gives a purified silica product which retains a plate-like structure similar to that of the kaolin clay with a high surface area and a particle size distribution similar to that of the clay starting material and which has an acid nature.

This purified silica product, produced by the further treatment of the first silica product with hot sulfuric acid, is itself a valuable material for use as an acid catalyst, e.g., in oil cracking catalytic processes, or as a bleaching earth, or as a catalyst carrier. This acid pigment can also be used as a filler for paper. Its use is similar to that of the use of the unpurified acid silica product above referred to, but has the advantage that it is a purified silica product and a pigment of high brightness.

By neutralizing this purified acid silica product with a base such as ammonium hydroxide or sodium hydroxide, it can be converted into an excellent paper coating pigment of high brightness. The removal of the salts formed by neutralization, by washing, leaves the silica pigment with an alkaline surface, in contrast with the acid surface of the acid silica product first produced and before neutralization.

The acid silica pigments, including both those remaining after the extraction of the alumina from the clay with dilute acids and those produced by the further concentrated sulfuric acid treatment of these pigments, are acid silica products which retain their acid nature even after repeated washing. When this acid surface is neutralized with alkali, the silica product is freed from its acid nature, and when the salts resulting from the neutralization are washed away, the resulting silica product has an alkaline surface in the sense that it apparently has adsorbed thereon small amounts of the alkali used for the neutralization and held even after repeated washing. The neutralized product, and particularly after the second concentrated sulfuric acid treatment, is a highly purified product of high brightness and a valuable product for use e.g. as a paper coating pigment.

The strength of the dilute phosphoric acid, or of the dilute phosphoric and sulfuric acids, used for extracting the alumina from the calcined clay can vary somewhat, e.g., between about 20% and about 50%, and more advantageously about 25% to 30%. One advantage of the use of dilute acids for the extraction of clay is that the resulting acid solution containing the dissolved aluminum can be readily separated from the silica residue; and the silica residue can then be further washed to free it from adhering soluble aluminum salts.

The extraction of the clay with the dilute acid is advantageously carried out at an elevated temperature and with the use of apparatus which is resistant to the action of the dilute acid at elevated temperature, such as a glass lined reactor.

The invention will be further described in connection with the following examples, illustrative thereof, but it will be understood that the invention is not limited thereto. The parts are by weight.

*Example 1.*—200 parts of a Georgia kaolin clay that had been previously calcined for 1 hour at 1450° F. (788° C.) was heated for 1 hour at 95–105° C. with a dilute acid mixture made by diluting 210 parts of 85% phosphoric acid and 80 parts of 98% sulfuric acid and 860 parts of water.

At the end of the reaction, the reaction mixture was cooled to 60° C. and the undissolved residue removed by filtration. The residue was washed with 600 parts of a 5% phosphoric acid solution and again filtered. After drying overnight at 160° C., 129.6 parts of residue were obtained.

The washings were added to the original filtrate, and the combined filtrate was then added with vigorous agitation to a slurry containing 300 parts of calcium oxide in 1500 parts of water. This addition of the acid solution to the lime slurry, with violent stirring, maintains an excess of the lime and a progressive reaction of the acid solution with the excess lime and is an advantageous method of bringing about the neutralization and precipitation of the composite pigment. The final pH of the mixture was 6.7.

The white pigment product so obtained was recovered by filtration and was washed by re-suspension in water and filtration. The product was dried at about 100° C. and was then pulverized by means of a high speed hammermill (Mikro-Pulverizer). 510 parts by weight of product were obtained.

This composite pigment so produced had a G.E. brightness of about 10 to 14 points higher than that of a high grade Georgia coating clay. The pigment is a valuable pigment for use in coating paper, and its use in place of Georgia coating clays will increase the G.E. brightness of the coated sheet material usually by 5 to 10 G.E. brightness points. Its use will also give improved printing properties such as faster ink setting time.

The pigment is also a valuable pigment for use as a filler for paper, giving an improvement of e.g. about 5 to 6 points in G.E. brightness and an increase in opacity of about 2 to 3 points over that of a sheet filled with conventional filler clay.

When used in coating or filling compositions, the composite pigment of the above example gives a coating mixture of materially increased viscosity as compared with that of the pigment produced by Example 3, with the use of dilute phosphoric acid alone.

As illustrating the advantages of the pigment in comparison with high grade Georgia coating clay for the coating of paper, the coating of paper with the clay, with the pigment of the above example, and with a mixture of 90% Georgia coating clay and 10% of the pigment, gave coated sheets with a G.E. brightness, in the case of the clay coated paper, of 79.2, of the paper coated with the mixture of 90% clay and 10% of the above pigment, a G.E. brightness of 81.5, and a sheet coated with the above pigment alone of 88.8.

Typical samples of the composite pigment produced by the above example, after pulverizing, showed a particle size distribution (by electron micrograph count) of 18% between 1 and 2 microns, 81% less than 1 micron, and 1% between 2 and 5 microns. The specific gravity of the pigment was about 2.81; the specific surface area about 250 square meters per gram; and the ignition loss about 15%.

The composite pigment of the above example is a mixed pigment containing both aluminum and calcium as simple or complex phosphates and sulfates. Minor amounts of other materials are present as impurities, such as iron phosphates, where small amounts or iron are extracted with the aluminum, colloidal silica or silicic acids or phosphosilicic acids, which may act as protective colloids to give a fine particle size pigment, etc.

*Example 2.*—The extraction of the calcined clay was carried out as described in Example 1, and the resulting solution was removed from the residue as described in Example 1.

To the combined filtrates, produced as described in Example 1, there were added 405 parts of barium hydroxide $(Ba(OH)_2 \cdot H_2O)$ in 1400 parts of water, to bring the pH to 6.0. The resulting precipitated product, recovered by filtration, was washed by resuspension and filtration, dried at about 80° C. and micropulverized, and gave 668 parts by weight of the dried product, which in this case had an ignition loss of 9%.

The product produced in this case is a different composite phosphate-sulfate pigment from that of Example 1, containing aluminum and barium in the form of simple or complex phosphates or sulfates.

*Example 3.*—200 parts of Georgia kaolin clay that had been previously calcined for 1 hour at 1450° F. was heated for 1 hour at 95–105° C. with dilute phosphoric acid made by admixing 300 parts of 85% phosphoric acid with 860 parts of water.

The reaction mixture was then cooled to about 50° C. and the undissolved residue removed by filtration. The residue was washed with 600 parts of a 5% phosphoric acid solution and again filtered. 159.8 parts of residue were obtained after drying over night at 100–110° C.

The washings were added to the original filtrate and the combined filtrates were then added with violent agitation to a lime slurry containing 300 parts of calcium oxide in 1500 parts of water. The final pH of the material was about 6.7.

The white product so produced was recovered by filtration and was washed once by resuspension in water and filtration. The product was dried at 100° C. and was then pulverized by means of a high speed hammermill (Mikro-Pulverizer).

The product so produced had a G.E. brightness of 97–100, which is some 10–14 points higher than that of a high grade Georgia coating clay. The use of this pigment in place of Georgia coating clay will result in increase of brightness of a coated sheet by about 5–10 G.E. brightness points, and will also improve some of the printing properties of the sheet, such as ink setting time.

The viscosity of the coating mixture made with the above pigment will be about the same or, in some cases, lower than that of a coating mixture containing only kaolin clay. When used in admixture with a clay, an increase in the G.E. brightness of the coated sheet will also result. Sheets coated with the above pigment, when calendered, show lack of darkening.

As illustrating the advantages of the above pigment, sheets similarly coated in one case with a high grade Georgia coating clay, and in the other case with the above pigment, showed a G.E. brightness of the clay coated sheet of 78.8, and of the sheet coated with the above pigment of 83.5. After calendering, the G.E. brightness of the clay coated sheet was 77.1 and of the sheet coated with the above pigment was 83.2. The coating viscosity of a coating composition at 35% solids was lower for the above pigment than for clay.

The composite pigment of this example is a complex phosphate pigment containing the aluminum and calcium as simple or complex phosphates and, in this case, as in Example 1, minor amounts of other materials such as iron phosphates, colloidal silica or silicic acids or phosphosilicic acids may be present.

*Example 4.*—Calcined clay was treated with hot dilute phosphoric acid as described in Example 3, and the resulting solution was separated from the residue by filtration, and the residue was washed, as described in Example 3.

To the combined filtrates, while violently agitated, there was added a solution containing 300 parts of barium hydroxide $(Ba(OH)_2 \cdot H_2O)$ in 10,000 parts of water, to bring the pH to 6.1. The composite precipitate thus formed was recovered by filtration, washed by re-suspension and filtration, and dried at 80° C., giving 479 parts by weight of the dried product. This product was micropulverized. It had an ignition loss of 9.15%. It had a materially lower coating viscosity than coating clay and gave a somewhat increased brightness when used for coating paper.

The composite product in this case is a composite phosphate pigment containing both aluminum and barium as simple or complex phosphates.

The silica residue remaining after the extraction of dilute phosphoric and sulfuric acids, as described in Example 1, or after extracting the calcined clay with dilute phosphoric acid, as described in Example 3, is essentially silica, containing some unreacted or partially reacted clay and some aluminum phosphates, or phosphates and sulfates, which are absorbed or mechanically bound on the clay or on the silica, together with some phosphoric acid or phosphoric and sulfuric acids, and a portion of the trace impurities that were present in the calcined clays, such as small amounts of titanium ores or compounds.

This silica residue is an acidic material and has a large surface area and a plate-like structure (microscopical) and a particle size distribution similar to that of the clay treated. Its brightness is similar to or slightly better than that of the clay used as the starting material.

This silica residue is of sufficient purity to enable it to be used for various purposes, for example, as an acid catalyst or as a catalyst support or as a bleaching earth, etc. Some of the impurities of the calcined clay, in so far as they are soluble in and extracted by the dilute acid treatment, are removed by that treatment. But the impurities, such as certain titanium ores or titanium-iron compounds, which are insoluble in dilute acid, remain in the acid silica product.

This acid residue, when neutralized with an alkali such as ammonium hydroxide or sodium hydroxide, and washed to remove the soluble salts formed by the neutralization, is converted into an alkaline silica residue with adsorbed alkali and is a valuable material for use, e.g., in paper coating.

*Example 5.*—The insoluble silica residue produced and separated as described in Example 1, and remaining after the extraction of the aluminum with a mixture of phosphoric and sulfuric acids, was further treated to produce an improved silica product by the following treatment:

480 parts of the silica residue produced as described in Example 1 was added to and stirred into 1350 parts of concentrated sulfuric acid and the mixture heated to boiling, about 250° C., and held at this temperature for half an hour. The resulting material was then allowed to cool and was then diluted by the gradual and cautions addition of 3,000 parts of water. The remaining insoluble residue was a very white product and was removed from the diluted acid solution by filtration and the product so removed was washed by re-dispersion in water and again filtered. The recovery was about 90% by weight based on the weight of the silica product treated.

This treatment of the somewhat impure silica product with concentrated sulfuric acid results in the removal of impurities and particularly of those impurities which decrease the brightness of the product, such as titanium compounds or titanium-iron compounds, with the result that a purified silica pigment is obtained with high brightness, high surface area, a plate-like structure, and with a particle size distribution similar to that of the silica residue before treatment. And this improved silica product also has an acidic surface, retaining an acid surface even after repeated washing with water. And it has a very low content of impurities and is substantially free from impurities extractable by the concentrated sulfuric acid.

The improved and purified silica products produced as described in this example had G.E. brightness values ranging from 93 to 100, abrasion values ranging from 40 to 127 mg., a specific resistance in the range of 34,000 to 36,000 ohms, and pH values well on the acid side (pH 1-3). Electron micrographs showed the product to be composed of flat, plate-like particles that could not be visually distinguished from kaolinite. The particle size distribution was similar to that of a high grade coating clay. The surface area ranged from 250 to 300 square meters per gram.

This purified acid silica pigment is a valuable acid catalyst for use, e.g., in the cracking of pertoleum oils, for use as a catalyst support, and for use as a bleaching earth. It is also a valuable pigment for use as a filler for paper, improving the color of the paper, and the acid of the pigment serving to neutralize part of the alkali of the paper pulp. By neutralizing this silica product with an alkali such as a solution of ammonium hydroxide or sodium hydroxide, and by washing the neutralized product to remove soluble salts, a highly purified alkaline silica catalyst is obtained with an alkaline surface instead of an acid surface. Such a neutralized product is a valuable white pigment for use in the coating of paper, either alone or admixed with coating clays, giving to the coated paper an improved brightness as compared with that of the paper coated with the coating clay alone.

The process of the above example can be varied somewhat in amount of acid used and in the temperature employed, using e.g. concentrated sulfuric acid at a temperature of 200° to 300° C. for varying periods of time up to about one hour and removing the remaining undissolved silica residue from the acid containing the soluble materials extracted from the residue by the concentrated sulfuric acid treatment. Thus, where the somewhat impure silica residue from the dilute acid extraction of Examples 1 or 3 may contain up to 3% to 7% of aluminum oxide, this residual alumina will be substantially all removed by the concentrated sulfuric acid treatment to give a purified silica product substantially free from aluminum. The aluminum thus dissolved and present in the concentrated acid can be recovered as alum by conventional methods.

It will thus be seen that the present invention provides improved processes for the treatment of clay to produce therefrom valuable composite phopshate pigments, or valuable composite phosphate-sulfate pigments, and also for the production of a valuable silica residue, and a purified silica residue. The process is one in which the clay is first calcined at a regulated temperature and is then treated with hot dilute phosphoric acid, or with a mixture of hot dilute phosphoric and sulfuric acids, to extract the alumina from the calcined clay and to leave an acid silica residue. The dilute acid solution containing the dissolved aluminum is neutralized by treatment with an alkaline compound of a metal which will form an insoluble percipitate, such as lime or barium hydroxide, to form composite aluminum-calcium pigments or aluminum-barium pigments. And these pigments will differ with the different methods of extraction, the pigments obtained when dilute phosphoric acid is used for extracting the alumina being composite phosphate pigments, while those obtained when a mixture of dilute phosphoric and sulfuric acids is used for extracting the alumina will give composite phosphate-sulfate pigments.

It will also be seen that the dilute acid extraction of the alumina from the calcined clay gives an initial silica residue of an acid nature, freed from impurities soluble in the dilute acid used for extracting the alumina but still containing impurities insoluble in the dilute acid but soluble in concentrated sulfuric acid. And the further treatment of this silica residue first produced, by further treatment with concentrated sulfuric acid, produces an improved white silica pigment in a highly purified form and with valuable properties as a pigment, as a catalyst or catalyst carrier, etc., and convertible by neutralization into a neutral or alkaline silica product, valuable as a pigment, e.g. for coating paper.

We claim:

1. The method of treating clay which comprises calcining the clay at a temperature of about 500° to 900° C., treating the calcined clay with hot dilute acid, of from about 20% to about 50% strength selected from the group which consists of phosphoric acid and a mixture of sulfuric acid and phosphoric acid, to extract alumina from the calcined clay and to give a silica residue, the amount of phosphoric acid in the hot dilute acid being at least approximately equal to the amount required to produce aluminum phosphate with the alumina content of the clay and the total amount of hot dilute acid being a sufficient excess to keep the dissolved aluminum salts in solution, separating the resulting acid solution from the residue, and neutralizing the resulting acid solution with an alkaline compound which forms an insoluble precipitate with the acid of such solution.

2. The process according to claim 1 in which dilute phosphoric acid alone is used for the extraction and in which precipitation by neutralization gives a composite phosphate pigment.

3. The process according to claim 1 in which a mixture of dilute phosphoric and sulfuric acids is used for the extraction with resulting production on neutralization of a composite phosphate-sulfate pigment.

4. A silica product resulting from the extraction of most of the alumina from calcined clay with an excess of hot dilute mineral acid including phosphoric acid in amount at least approximately equal to the alumina content of the clay, said silica product containing a small amount of alumina, corresponding to only a small proportion of the alumina of the calcined clay, a small amount of aluminum phosphate and a small amount of clay impurities insoluble in dilute acid but soluble in concentrated sulfuric acid, said silica product having an acid surface, a plate-like structure and a particle size distribution similar to that of clay, said acid silica product being capable of neutralization with alkali to form a silica product having an alkaline surface.

References Cited in the file of this patent

UNITED STATES PATENTS

| | | |
|---|---|---|
| 1,953,144 | Wilson | Apr. 3, 1934 |
| 1,959,784 | Svendeen | May 22, 1934 |
| 2,010,655 | Wollner et al. | Aug. 6, 1935 |
| 2,248,472 | Zintl et al. | July 8, 1941 |
| 2,485,626 | Mills | Oct. 25, 1949 |
| 2,586,852 | Morrell | Feb. 26, 1952 |
| 2,636,830 | Woll | Apr. 28, 1953 |
| 2,765,238 | Allen | Oct. 2, 1956 |
| 2,798,792 | Stelling et al. | July 9, 1957 |